US012670706B2

(12) United States Patent
Valentine et al.

(10) Patent No.: US 12,670,706 B2
(45) Date of Patent: Jun. 30, 2026

(54) META-OPTIC ACCELERATORS FOR OBJECT CLASSIFIERS

(71) Applicant: Vanderbilt University, Nashville, TN (US)

(72) Inventors: Jason Valentine, Nashville, TN (US); Yuankai Huo, Nashville, TN (US); Hanyu Zheng, Nashville, TN (US); Quan Liu, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 513 days.

(21) Appl. No.: 18/159,832

(22) Filed: Jan. 26, 2023

(65) Prior Publication Data

US 2023/0237790 A1     Jul. 27, 2023

Related U.S. Application Data

(60) Provisional application No. 63/303,445, filed on Jan. 26, 2022.

(51) Int. Cl.
| | |
|---|---|
| *G06V 10/82* | (2022.01) |
| *G06V 10/764* | (2022.01) |
| *G06V 10/77* | (2022.01) |
| *G06V 10/774* | (2022.01) |

(52) U.S. Cl.
CPC ............ *G06V 10/82* (2022.01); *G06V 10/764* (2022.01); *G06V 10/7715* (2022.01); *G06V 10/774* (2022.01)

(58) Field of Classification Search
None
See application file for complete search history.

(56) References Cited

U.S. PATENT DOCUMENTS

| | | | | |
|---|---|---|---|---|
| 2021/0174186 A1* | 6/2021 | Bowen | ..................... | G06N 3/08 |
| 2023/0298145 A1* | 9/2023 | Miscuglio | ................ | G06N 3/08 |
| | | | | 382/279 |
| 2025/0078291 A1* | 3/2025 | Valentine | ............. | G06N 3/0464 |

OTHER PUBLICATIONS

Photodetector. (1998). In G. Held, Dictionary of Communications Technology: Terms, Definitions and Abbreviations, Wiley (3rd ed.). Wiley. https://search.credoreference.com/articles/Qm9va0FydGljbGU6MTQ3OTgwNQ==?aid=279753 (Year: 1998).*

(Continued)

*Primary Examiner* — Amandeep Saini
*Assistant Examiner* — Caroline Tabancay Duffy
(74) *Attorney, Agent, or Firm* — Meunier Carlin & Curfman LLC

(57) ABSTRACT

A system for identifying objects in images is provided. The system may include an optical front end and a digital back end. The optical front end includes a metalens that duplicates a received image into multiple images, and a metasurface that receives the duplicate images and outputs a feature map based on the received images. The feature map may be equivalent to the computationally expensive convolution operations previously performed by a neural network. The feature map is provided to the digital back end, which uses a neural network to classify the object. Because the feature map included the convolution operations, the digital back end can classify the object more quickly and using fewer computing resources than previous systems.

19 Claims, 5 Drawing Sheets

(56)          References Cited

OTHER PUBLICATIONS

Chang, J., Sitzmann, V., Dun, X., Heidrich, W., & Wetzstein, G. (2018). Hybrid optical-electronic convolutional neural networks with optimized diffractive optics for image classification. Scientific Reports, 8(1), 12324-10. https://doi.org/10.1038/s41598-018-30619-y (Year: 2018).*

Brownlee J. (2019). How to Visualize Filters and Feature Maps in Convolutional Neural Networks. Machine Learning Mastery. https://machinelearningmastery.com/how-to-visualize-filters-and-feature-maps-in-convolutional-neural-networks/. (Year: 2019).*

Abdollahramezani, S., Hemmatyar, O., & Adibi, A. (2020). Meta-optics for spatial optical analog computing. Nanophotonics (Berlin, Germany), 9(13), 4075-4095. https://doi.org/10.1515/nanoph-2020-0285 (Year: 2020).*

Q. Guo, Z. Shi, Y. Huang, E. Alexander, C. Qiu, F. Capasso, & T. Zickler, Compact single-shot metalens depth sensors inspired by eyes of jumping spiders, Proc. Natl. Acad. Sci. U.S.A. 116 (46) 22959-22965, https://doi.org/10.1073/pnas.1912154116 (2019). (Year: 2019).*

Lin, Z., Pestourie, R., Roques-Carmes, C., Li, Z., Capasso, F., Soljačić, M., & Johnson, S. G. (2022). End-to-end metasurface inverse design for single-shot multi-channel imaging. Optics Express, 30(16), 28358. https://doi.org/10.1364/OE.449985 (Year: Lin).*

Butler, Susan, editor. "Duplicate." The Macquarie Dictionary, 7th ed., 2017. Infobase, https://access.infobase.com/article/2169718-duplicate?aid=279753. (Year: 2017).*

Wang, E., Shi, L., Niu, J., Hua, Y., Li, H., Zhu, X., Xie, C., & Ye, T. Vector Vortex Beam Arrays: Multichannel Spatially Nonhomogeneous Focused Vector Vortex Beams for Quantum Experiments (Advanced Optical Materials Aug. 2019). Advanced Optical Materials, 7(8). https://doi.org/10.1002/adom.201970029. (Year: 2019).*

Simonyan, K. & Zisserman, A. Very deep convolutional networks for large-scale image recognition. 3rd Int. Conf. Learn. Represent. ICLR 2015—Conf. Track Proc. 1-14 (2015).

Wang, G. et al. Interactive Medical Image Segmentation Using Deep Learning with Image-Specific Fine Tuning. IEEE Trans. Med. Imaging 37, 1562-1573 (2018).

Furui, S., Deng, L., Gales, M., Ney, H. & Tokuda, K. Fundamental technologies in modern speech recognition. IEEE Signal Process. Mag. 29, 16-17 (2012).

Sak, H., Senior, A., Rao, K. & Beaufays, F. Fast and accurate recurrent neural network acoustic models for speech recognition. Proc. Annu. Conf. Int. Speech Commun. Assoc. INTERSPEECH Jan. 2015, 1468-1472 (2015).

Devlin, J., Chang, M. W., Lee, K. & Toutanova, K. Bert: Pre-training of deep bidirectional transformers for language understanding. NAACL HLT 2019—2019 Conf. North Am. Chapter Assoc. Comput. Linguist. Hum. Lang. Technol.—Proc. Conf. 1, 4171-4186 (2019).

Lecun, Y., Bengio, Y. & Hinton, G. Deep learning. Nature 521, 436-444 (2015).

Wetzstein, G. et al. Inference in artificial intelligence with deep optics and photonics. Nature 588, 39-47 (2020).

Shastri, B. J. et al. Photonics for artificial intelligence and neuromorphic computing. Nat. Photonics 15, 102-114 (2021).

Wang, T. et al. An optical neural network using less than 1 photon per multiplication. 1-8 (2021) doi:10.1038/s41467-021-27774-8.

Xu, X. et al. 11 TOPS photonic convolutional accelerator for optical neural networks. Nature 589, 44-51 (2021).

Feldmann, J. et al. Parallel convolutional processing using an integrated photonic tensor core. Nature 589, 52-58 (2021).

Chen, Y. H., Krishna, T., Emer, J. S. & Sze, V. Eyeriss: An Energy-Efficient Reconfigurable Accelerator for Deep Convolutional Neural Networks. IEEE J. Solid-State Circuits 52, 127-138 (2017).

Neshatpour, K., Homayoun, H. & Sasan, A. ICNN: The iterative convolutional neural network. ACM Trans. Embed. Comput. Syst. 18, (2019).

Hamerly, R., Bernstein, L., Sludds, A., Soljačić, M. & Englund, D. Large-Scale Optical Neural Networks Based on Photoelectric Multiplication. Phys. Rev. X 9, 1-12 (2019).

Mennel, L. et al. Ultrafast machine vision with 2D material neural network image sensors. Nature 579, 62-66 (2020).

Del Hougne, P., Imani, M. F., Diebold, A. V., Horstmeyer, R. & Smith, D. R. Learned Integrated Sensing Pipeline: Reconfigurable Metasurface Transceivers as Trainable Physical Layer in an Artificial Neural Network. Adv. Sci. 7, 1-8 (2020).

Wu, C. et al. Programmable phase-change metasurfaces on waveguides for multimode photonic convolutional neural network. Nat. Commun. 12, 1-8 (2021).

Zhang, H. et al. An optical neural chip for implementing complex-valued neural network. Nat. Commun. 12, 1-11 (2021).

Zhou, Y. et al. Multifunctional metaoptics based on bilayer metasurfaces. Light Sci. Appl. 8, (2019).

Wang, X., Díaz-Rubio, A. & Tretyakov, S. A. Independent Control of Multiple Channels in Metasurface Devices. Phys. Rev. Appl. 14, 1 (2020).

Lin, Z. et al. End-to-end metasurface inverse design for single-shot multi-channel imaging. 1-17 (2021).

Li, L. et al. Monolithic Full-Stokes Near-Infrared Polarimetry with Chiral Plasmonic Metasurface Integrated Graphene-Silicon Photodetector. ACS Nano 14, 16634-16642 (2020).

Reshef, O. et al. An optic to replace space and its application towards ultra-thin imaging systems. Nat. Commun. 12, 8-15 (2021).

Chang, J., Sitzmann, V., Dun, X., Heidrich, W. & Wetzstein, G. Hybrid optical-electronic convolutional neural networks with optimized diffractive optics for image classification. Sci. Rep. 8, 1-10 (2018).

Yan, T. et al. Fourier-space Diffractive Deep Neural Network. Phys. Rev. Lett. 123, 23901 (2019).

Colburn, S., Chu, Y., Shilzerman, E. & Majumdar, A. Optical frontend for a convolutional neural network. Appl. Opt. 58, 3179 (2019).

Zhou, T. et al. Large-scale neuromorphic optoelectronic computing with a reconfigurable diffractive processing unit. Nat. Photonics 15, 367-373 (2021).

Lin, X. et al. All-optical machine learning using diffractive deep neural networks. Science (80-. ). 361, 1004-1008 (2018).

Qian, C. et al. Performing optical logic operations by a diffractive neural network. Light Sci. Appl. 9, (2020).

Luo, X. et al. Metasurface-Enabled On-Chip Multiplexed Diffractive Neural Networks in the Visible (May 27, 2022) .

Khorasaninejad, M. et al. Multispectral chiral imaging with a metalens. Nano Lett. 16, 4595-4600 (2016).

Arbabi, E., Kamali, S. M., Arbabi, A. & Faraon, A. Full-Stokes Imaging Polarimetry Using Dielectric Metasurfaces. ACS Photonics 5, 3132-3140 (2018).

Rubin, N. A. et al. Matrix Fourier optics enables a compact full-Stokes polarization camera. Science (80-. ). 364, (2019).

Zhao, R. et al. Multichannel vectorial holographic display and encryption. Light Sci. Appl. 7, (2018).

Kwon, H., Arbabi, E., Kamali, S. M., Faraji-Dana, M. S. & Faraon, A. Single-shot quantitative phase gradient microscopy using a system of multifunctional metasurfaces. Nat. Photonics 14, 109-114 (2020).

McClung, A., Samudrala, S., Torfeh, M., Mansouree, M. & Arbabi, A. Snapshot spectral imaging with parallel metasystems. Sci. Adv. 6, 1-9 (2020).

LeCun, Y., Bottou, L., Bengio, Y. & Haffner, P. Gradient-based learning applied to document recognition. Proc. IEEE 86, 2278-2323 (1998).

Ding, F., Tang, S. & Bozhevolnyi, S. I. Recent Advances in Polarization-Encoded Optical Metasurfaces. Adv. Photonics Res. 2, 2000173 (2021).

Kim, I. et al. Pixelated bifunctional metasurface-driven dynamic vectorial holographic color prints for photonic security platform. Nat. Commun. 12, 1-9 (2021).

Li, L. et al. Intelligent metasurface imager and recognizer. Light Sci. Appl. 8, (2019).

Li, L. et al. Machine-learning reprogrammable metasurface imager. Nat. Commun. 10, (2019).

(56)     References Cited

OTHER PUBLICATIONS

Kamali, S. M., Arbabi, E., Arbabi, A. & Faraon, A. A review of dielectric optical metasurfaces for wavefront control. Nanophotonics 7, 1041-1068 (2018).

Ren, H. et al. Complex-amplitude metasurface-based orbital angular momentum holography in momentum space. Nat. Nanotechnol. 15, 948-955 (2020).

Shi, Z. et al. Continuous angle-tunable birefringence with freeform metasurfaces for arbitrary polarization conversion. Sci. Adv. 6, 1-8 (2020).

Zhou, Y., Zheng, H., Kravchenko, I. I. & Valentine, J. Flat optics for image differentiation. Nat. Photonics 14, 316-323 (2020).

Khorasaninejad, M. et al. Metalenses at visible wavelengths: Diffraction-limited focusing and subwavelength resolution imaging. Science (80-. ). 352, 1190-1194 (2016).

Overvig, A. C. et al. Dielectric metasurfaces for complete and independent control of the optical amplitude and phase. Light Sci. Appl. 8, (2019).

Li, N. et al. Large-area metasurface on CMOS-compatible fabrication platform: Driving flat optics from lab to fab. Nanophotonics 9, 3071-3087 (2020).

Zheng, H. et al. Large-Scale Metasurfaces Based on Grayscale Nanosphere Lithography. ACS Photonics 8, 1824-1831 (2021).

Howes, A., Wang, W., Kravchenko, I. & Valentine, J. Dynamic transmission control based on all-dielectric huygens metasurfaces. Opt. InfoBase Conf. Pap. Part F114-FIO 2018, 787-792 (2018).

Hugonin, A. J. P. & Lalanne, P. Reticolo Code 1D for the diffraction by stacks of lamellar 1D gratings. 1-16 (2012).

Hughes, T. W., Minkov, M., Liu, V., Yu, Z. & Fan, S. A perspective on the pathway toward full wave simulation of large area metalenses. Appl. Phys. Lett. 119, (2021).

* cited by examiner

100

300

410
Receive an image of an object

420
Duplicate image into a plurality of images

430
Output a feature map based on the plurality of images

440
Receive feature map

450
Process feature map using neural network

460
Output classification of object

400

500

META-OPTIC ACCELERATORS FOR OBJECT CLASSIFIERS

CROSS-REFERENCE TO RELATED APPLICATIONS

This application claims priority to U.S. Provisional Patent No. 63/303,445, filed on Jan. 26, 2022, entitled "META-OPTIC ACCELERATORS FOR OBJECT CLASSIFIERS." The contents of which are hereby incorporated by reference.

STATEMENT REGARDING FEDERALLY SPONSORED RESEARCH OR DEVELOPMENT

This invention was made with government support under grant number HR001118C0015 awarded by DARPA. The government has certain rights in the invention.

BACKGROUND

Digital neural networks (NNs) and the availability of large training datasets have allowed for rapid progress in the performance of machine-based tasks for a wide range of applications including image analysis, sound recognition, and natural language translation. The enhanced capability, however, comes at a computational cost as increased complexity and accuracy, has necessitated the need for ever larger deep neural networks (DNNs). The ever-increasing computational requirements of DNNs have resulted in unsustainable growth in energy consumption and restrictions in real-time decision making when large computational systems are not available.

One alternative to DNNs is the use of optical processors that have the advantages of ultra-fast processing times and low energy costs. These systems can be employed as stand-alone processors or as front end accelerators for digital systems. In either case, optical systems are most impactful when used for the linear matrix-vector multiplications, that comprise the convolution operations in DNNs. These operations are often the most computationally burdensome components typically comprising more than 90% of the required floating-point operations (FLOPs) in popular DNNs. There are both free-space and chip-based approaches to optical processors but in either case, the computational advantage is achieved via the massively parallel and low power processing that is possible with optics. In the case of image analysis, free-space approaches are attractive as spatial multiplexing can be readily achieved as well as the fact that an optical front end can potentially be integrated directly with an imaging system.

The most traditional approach to free-space based optical image processing is the use of 4f optical correlators where spatial filters, either passive or dynamic, are placed in the Fourier plane of a 2-lens optical system. Recorded spatial features are then fed to a lightweight digital NN back end for classification. An alternative approach is the use of diffractive neural networks which utilize cascaded diffractive elements as convolutional layers. Image classification is realized through redistribution of optical energy on the detector plane requiring minimal digital processing. The tradeoff is the need for several diffractive layers as well as coherent illumination, precluding use with ambient lighting. While these approaches have shown benefits in terms of processing speed and energy consumption, they necessitate enlarged imaging systems. Furthermore, none of these approaches utilize the additional information channels, such as polarization, that are available when utilizing an optical front end.

SUMMARY

In one embodiment, a system for identifying objects in images is provided. The system may include an optical front end and a digital back end. The optical front end includes a metalens that duplicates a received image into multiple images, and a metasurface that receives the duplicate images and outputs a feature map based on the received images. The feature map may be equivalent to the computationally expensive convolution operations previously performed by a neural network. The feature map is provided to the digital back end, which uses a neural network to classify the object. Because the feature map included the convolution operations, the digital back end can classify the object more quickly and using fewer computing resources than previous systems.

The proposed optical front end based object classifier can be massively parallel and can serve to bridge the gap between the natural object and digital neural network analysis. The approach can allow one to harness the strengths of both free-space and electronic or optical chip-based architectures. Moreover, the ability to operate with incoherent illumination enables machine-vision applications with passive ambient lighting which is incompatible with diffractive neural networks. The current optical approach is limited to linear operations, which prevents the use of activation functions, but these types of layers could be added in the future based on non-linear media. Even without optical activation functions, further optimization of the neural network architecture could be used to off-load more linear operations into the front end. End-to-end optimization also provides a robust platform that can balance the trade-off between bandwidth as well as the aperture size for a meta-optic system. These advantages allow meta-optic accelerators to achieve superior processing speed while also lowering power consumption and thus could lead to advances in a wide range of compact, low-power, and high-speed computer vision systems.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
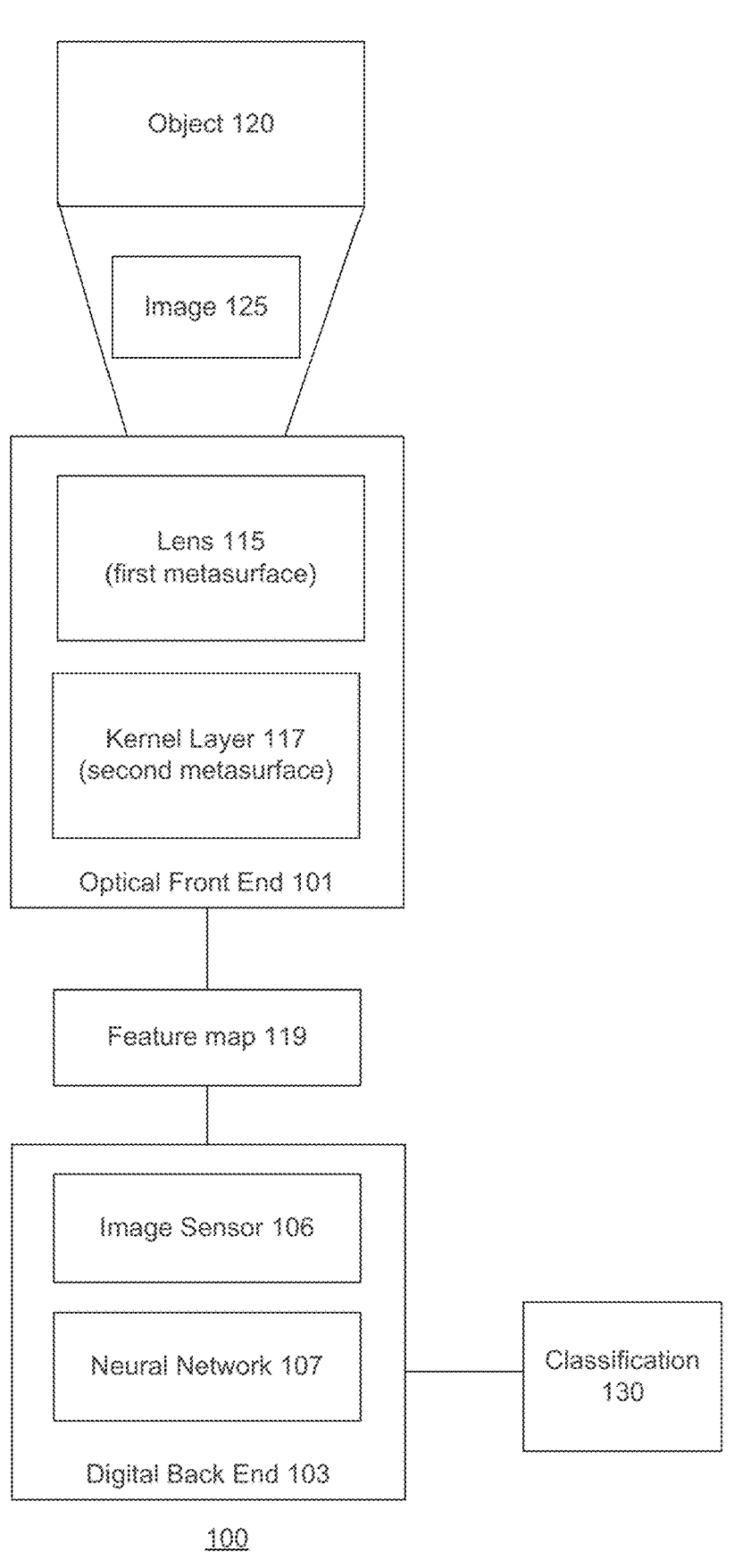
FIG. 1 is an illustration of an example object classification system.
Figure 2:
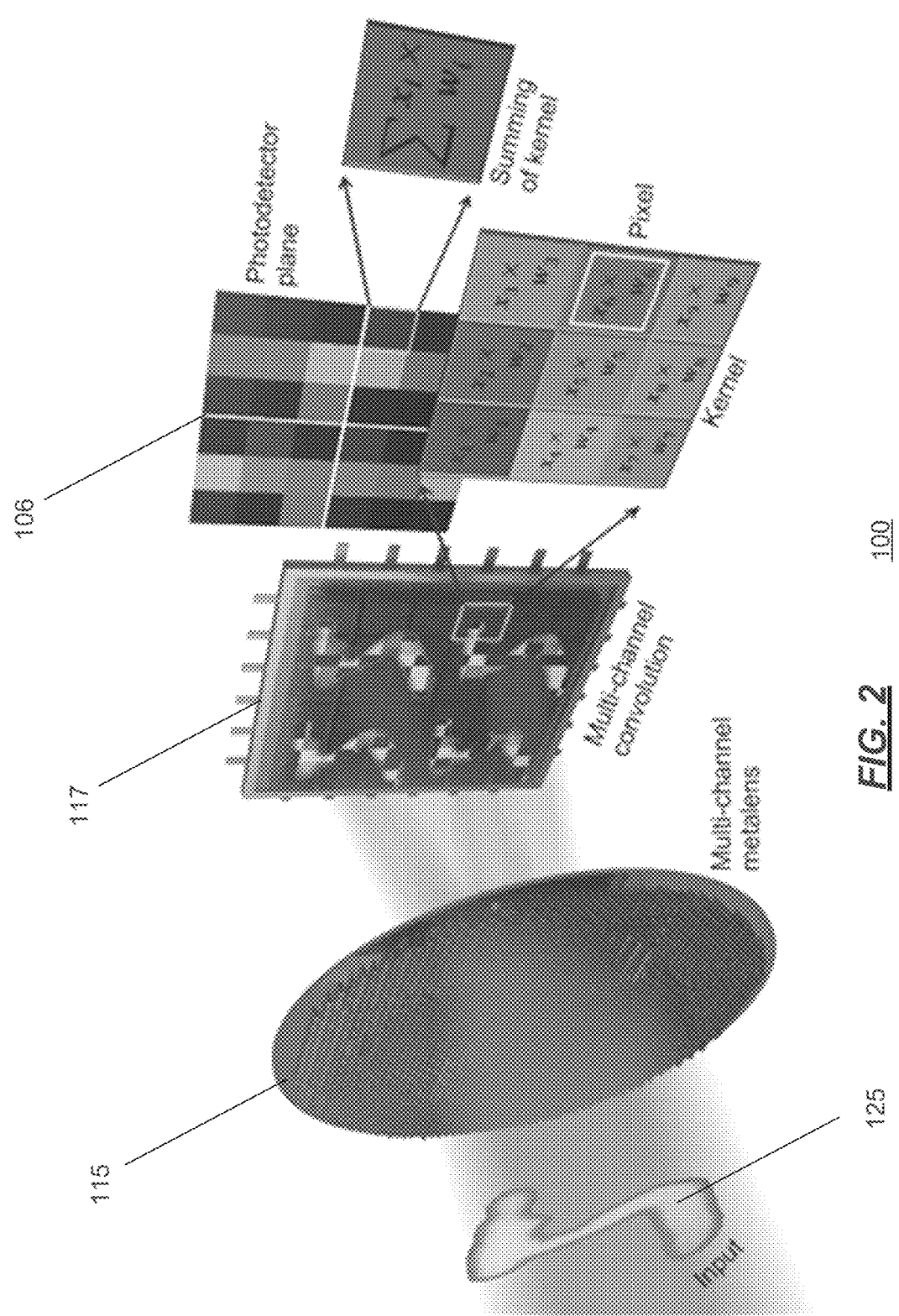
FIG. 2 is another illustration of an example object classification system.

FIGS. 1 and 2 are illustrations of an example object classification system 100. As shown, the system 100 includes two components, an optical front end 101 and a digital back end 103. The optical front end 101 (also referred to herein as the meta-optic accelerator) may include a lens 115 and a kernel layer 117. The digital back end 103 may include an image sensor 106 and a neural network 107. The digital back end 103 may be implemented by one or more general purpose computing devices such as the computing system 500 illustrated with respect to FIG. 5.

The object classification system 100 may receive as an input an image 125 of an object 120 and may output a classification 130 of the object 120. The classification 130 may be a histogram that includes one or more probabilities with respect to different classifications of the object 120. For example, where the object 120 is a letter of the alphabet, the classification may include a probability for each letter of the alphabet. The object classification system 100 may be a standalone device or may be integrated into a device such as a digital camera or a smartphone, for example.

In an embodiment, the lens 115 and the kernel layer 117 may each be a metasurface. Metasurfaces may be used due to the fact that they offer precise wavefronts, complex-amplitudes, and polarization state manipulation in an ultra-thin form factor. Metasurfaces have also been utilized as standalone systems for all-optical image processing, namely, edge detection, through manipulation of the non-local, angle-dependent, optical response.

With respect to the lens 115, the lens 115 may be a multi-channel metalens that duplicates an input image 125 into a plurality of images. An example number of images is nine images, but more or fewer images could be used.

Where nine images are used, the multi-channel metalens 115 may be created using nine meta-atoms per super-cell to create images at nine spatial locations. The metalens 115 may be created with a hyperbolic phase profile where the phase delay of each resonator, i, in the super-cell is given by to following equation 1:

$$\phi_i = \frac{2\pi}{\lambda}\left(f - \sqrt{f^2 + (x - a_i)^2 + (y - b_i)^2}\right) \tag{1}$$

In the equation 1, f is the focal length, $\lambda$ is the working wavelength, x and y are the spatial positions on the metalens, and a and b correspond to the displacement of each unique focal spot, i, from the center of the metalens. In some embodiments, the metalens 115 may be realized using columnar silicon nanopillars with a period of 0.6 $\mu$m and a height of 0.88 $\mu$m. The transmission coefficient may be selected as a function of unit cell parameters. The width of each meta-atom may be chosen such it provides the phase profile given by equation 1.

In some embodiments, fabrication of the metalens 115 may begin with a silicon device layer on quartz patterned by standard electron beam lithography (EBL), then followed by reactive-ion-etching (RIE). Spatial multiplexing may be used to create the multi-channel lens 115. However, as additional channels are added, a spatially multiplexed lens will suffer from higher order diffraction and resolution reduction due to a larger super-cell structure. One way this can be overcome is through the use of complex-valued amplitude modulation which eliminates the need for spatial multiplexing. Using this technique, metalenses 115 with multiple channels can be realized while preserving the spatial resolution of each image 125.

In some embodiments, the second metasurface of the optical front end 101 may be a multifunctional kernel layer 117 that provides the vector-matrix multiplication operations for the system 110. The kernel layer 117 may receive the duplicate images 125 from the lens 115, and may optically perform the vector multiplication operations on the duplicate images 125 to generate a feature map 119. The feature map 119 may then be received on the image sensor 106 of the digital back end 103.

The discretized kernels of the kernel layer 117 may be based on Pancharatnam-Berry metasurfaces that can encode polarization and/or amplitude information for convolution with the image 125. The second metasurface 117 may be made up of a plurality of rectangular nanopillars with a transmission of each rectangular nanopillar that follows an analytical model based on the Jones matrix given by the following equation 2:

$$\begin{bmatrix} E_{x,out} \\ E_{y,out} \end{bmatrix} = \begin{bmatrix} \cos(\theta) & \sin(\theta) \\ -\sin(\theta) & \cos(\theta) \end{bmatrix}\begin{bmatrix} e^{i\phi_x} & 0 \\ 0 & e^{i\phi_y} \end{bmatrix}\begin{bmatrix} \cos(\theta) & -\sin(\theta) \\ \sin(\theta) & \cos(\theta) \end{bmatrix}\begin{bmatrix} E_{x,in} \\ E_{y,in} \end{bmatrix} \tag{2}$$

In the equation 2, $E_{x,in}$, $E_{y,in}$ and $E_{x,out}$. $E_{y,out}$ are the x and y polarized incident and transmitted amplitude, respectively. $\phi_x$ and $\phi_y$ are the phase shifts provided by the resonator for x and y polarization, values that are dictated by the size of the resonator. $\theta$ is the pillar rotation angle, which determines the polarization conversion efficiency for a given pixel in the kernel layer 117.

In some embodiments, the kernel pattern of the kernel layer 117 is discretized to allow for a memory efficient architecture and one that is compatible with a dynamically reconfigurable system where pixelization is necessary due to practical limits on control electronics. In order to control the weights in each kernel, in some embodiments, a linearly polarized illumination is combined with an orthogonal polarizer, serving as an analyzer, that is placed in front of the image sensor 106. The rotation angle of each metaatom, $\theta$, dictates the percentage, or weight, of the incident light that has had its polarization vector rotated by 90°, thus passing the analyzer. In order to achieve amplitude modulation, spatial variations in $\phi_x$ and $\phi_y$ are not needed and are fixed as $|\phi_y - \phi_x| = \pi$ to simplify the model. In the case of x-polarized incident light the intensity of y-polarized transmitted light (i.e., the feature map 119) is given by the equation 3:

$$I_{y,out} = \sin(2\theta)^2 \cdot I_{x,in} \tag{3}$$

In the equation 3, $I_{in}$, $I_{y,in}$ and $I_{x,out}$, $I_{y,out}$ are the x and y polarized incident and transmitted intensities, respectively. The use of pillar rotation for controlling kernel weight in the kernel layer 117 has the advantage of being broadband while also allowing for precise control over the weight as rotation is readily controlled in the lithography process. T Transmission, $T_{yx}$ $I_{y,out}/I_{x,in}$ is a function of rotation angle and wavelength, revealing a 320 nm bandwidth where there is less than a 10% variation in transmission. Using this bandwidth, either the pixel size of the image sensor 106 or the kernel size of the kernel layer 117, determines the maximum areal density of neurons. In the case of the kernel layer 117, the meta-atoms in each pixel of the kernel may be designed as being periodic. Thus, as the number of meta-atoms in each uniform pixel is reduced there will be a deviation in the weight as the boundaries of the pixels, where periodicity is broken, play a larger role. In some embodiments, 3×3 pixel kernels may be used, and a minimum pixel size of 0.2 pixels/$\lambda^2$ is possible based on a maximum weight error of 10% where $\lambda$ is the working wavelength. Illumination at a wavelength of 1.3 $\mu$m yields a minimum pixel size of 3 $\mu$m×3 $\mu$m (5×5 meta-atoms) or ⁻1×10⁵ pixels/mm².

Figure 3:
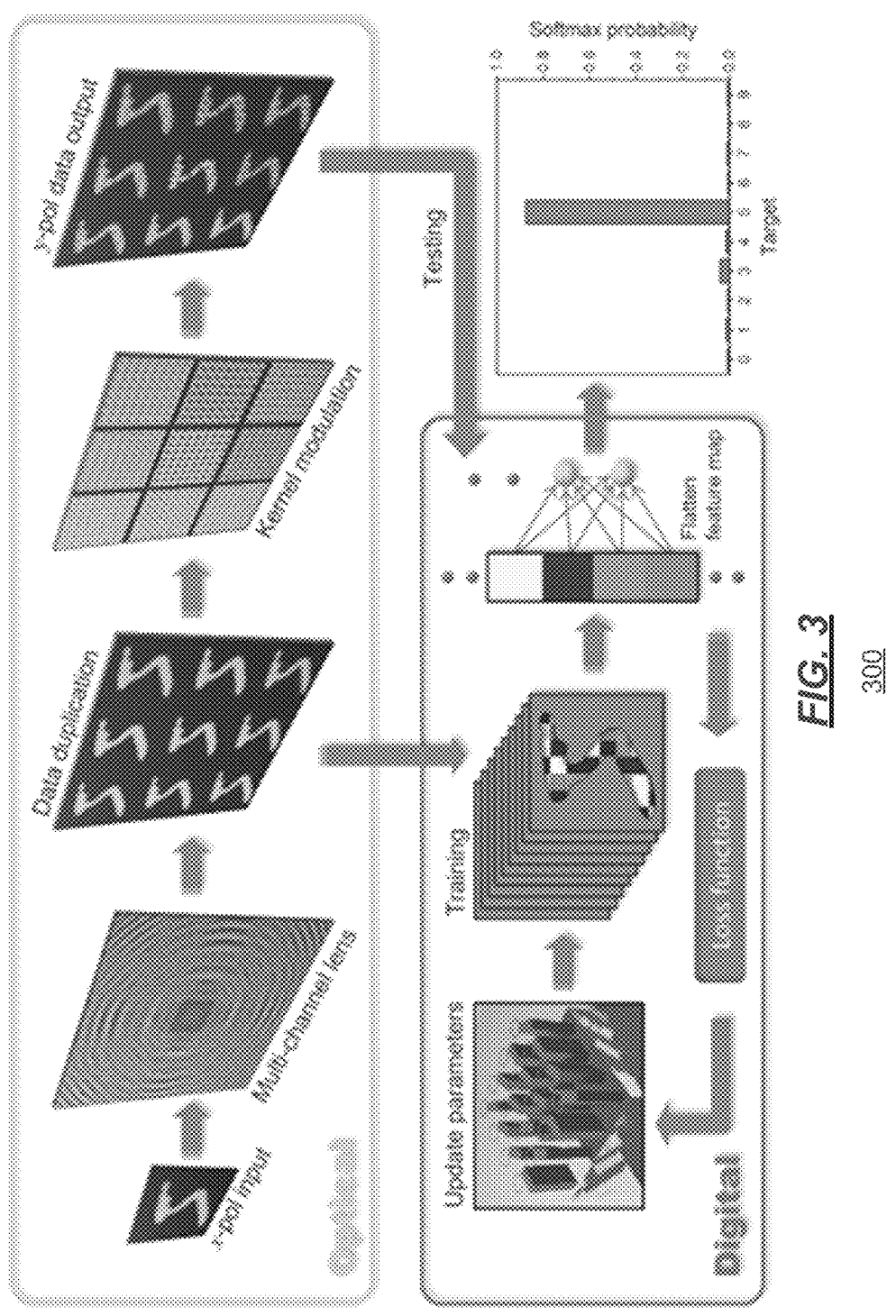
FIG. 3 is an illustration of an example method for training an object classification system.

FIG. 3 is an illustration of a method 300 for training an object classification system 100. In the example shown, the method 300 includes an optical and digital component where the optical front end 101 and the digital back end 103 are trained and optimized. The method 300 utilizes an end-to-end design where both the optical front end 101 and the digital back end 103 are co-optimized.

In the example shown, the metalens 115, with 9 independent channels, splits the image 125. The image 125 may be part of set of labeled training images 125. During a training phase, the split or duplicate images 125 are recorded on the image sensor 106 and used for training of the optical kernel layer 117 and the neural network 107. Once the kernel layer 117 is trained, it is inserted into the system and the training images 125 are then projected onto the kernel layer 117 generating 9 feature maps 119 that are recorded on the image sensor 106. The digital loop comprises an iterative training process in which the Jones matrix is used for forward propagation. The probability histogram (i.e., classification 130) is the final output for image classification.

In one embodiment, the system 100 is trained to classify 24×24 pixel MNIST digits using the 9 unique channels provided by the metalens 115. Each channel includes 3×3 pixel kernels with a stride of 3. Other strides may be used.

For the neural network 107, a shallow digital neural network 107 may be used comprising two fully connected layers with a ReLU function in between. In this architecture, 50% of the overall FLOPs of the neural network 107 are implemented by the kernel layer 117. Note that other types of neural networks 107 may be used including deep neural networks.

The optical front end 101 imposes unique constraints on the design of hybrid neural network structures as there are several noise sources in the analog signal being input, and output, from the optical front end 101. These noise sources may include stray light, detector noise, image misalignment due to variations in the optical systems, aberrations from off-axis imaging systems, and fabrication imperfections in the metalens 115 and kernel layers 117.

To account for noise in the projection, imaging, and detector systems the 10,000 training images 125 from the MNIST dataset are projected and recorded using the metalens 115 as the imaging optic, without the kernel layer 117. The optically recorded data is then used as the training data for the neural network 107 in the end-to-end design loop. In some embodiments, to simulate noise in the training process, special intensity fluctuations and random image rotations may be introduced. For example, a 10% spatial intensity fluctuation in the kernel layer 117 and random image 125 rotations within ±3 degrees may be used for the training images 125.

The feature maps 119, which correspond to the convolution of the metasurface kernel layer 117 with each of the 9 images, are used to form a mean-square-error (MSE) loss function. The backward propagation comprises a stochastic gradient descent (SGD) based algorithm driven by the loss function to update the physical parameters ($\phi_x$, $\phi_y$, and $\theta$) of the metasurface kernel layer 117 for each iteration. The physical model, based on the Jones matrix, is used in forward propagation during design and thus the evolution of the kernel weight is continuous with rotation angle, $\theta$. Without the use of the physical model, one would have to clamp the weights in order for the transmission to be restricted to the physically attainable range of 0 to 1. Ultimately, the continuous weight evolution enabled by the physical model was found to result in more accurate classification by avoiding local minimum during training of the network Once training is complete, the corresponding metasurface kernel layer 117 may be created using a silicon film on quartz with the device layer patterned into nanopillars with a period of 0.6 μm and a height of 0.88 μm. The metasurface kernel layer 117 may be fabricated using EBL patterning followed by RIE. The width and length of each nanopillar of the kernel layer 117 may be fixed as 160 nm and 430 nm, respectively, with the rotation angle set through training stage. Other methods for fabricating the kernel layer 117 may be used.

Once fabricated, the kernel layer 117 may be placed in the image plane of the metalens 115 for recording convoluted feature maps 119 from the testing dataset of images 125. In some embodiments, each kernel pixel comprises an 11×11 (6.6 μm×6.6 μm) meta-atom array. Summing of each kernel may be achieved optically via alignment of each kernel with an individual pixel on the image sensor 106, or may be performed digitally as the kernel layer 117 is magnified when imaged onto the image sensor 106 such that each kernel comprises multiple pixels of image sensor 106.

One of the unique strengths of metasurfaces, compared to conventional lenses or diffractive optical elements, is their ability to provide user-specified amplitude and phase functions while also being sensitive to the polarization state and wavelength of light. This allows for access to additional information carriers that are normally lost when recording an image on a camera enabling one to discriminate based on normally hidden features in the physical world such as vectorial polarization, phase gradients, or spectrally complex signals.

Accordingly, in one embodiment, polarization may be incorporated into the optical classification system 100. Polarization classification is possible due to the fact that the meta-atoms of the kernel layer 117 have a transmitted intensity that is dependent on the incident polarization state, given by the following equation 4 where $I_{x,in}$, $I_{y,in}$ and $I_{y,out}$ are the x and y polarized incident and transmitted intensities and θ is the meta-atom rotation angle, $$I_{y,out} = \cos(2\theta)^2 \cdot I_{y,in} + \sin(2\theta)^2 \cdot I_{x,in} \qquad (4)$$

While the output signals between the x and y polarized channel are correlated, the mechanism for polarization recognition is independent from object classification and the latter requires feature map analysis provided by the convolution process as described above. In the case of polarization, the birefringence of the meta-atoms of the kernel layer 117 enables the conversion of the polarization state to an intensity value. The intensity arising from the polarization state is constant across the channel and is completely independent of the spatially varying amplitude value. Hence, both functions, polarization and amplitude classification, can be integrated into a single meta-optic for multifunctional analysis.

Figure 4:
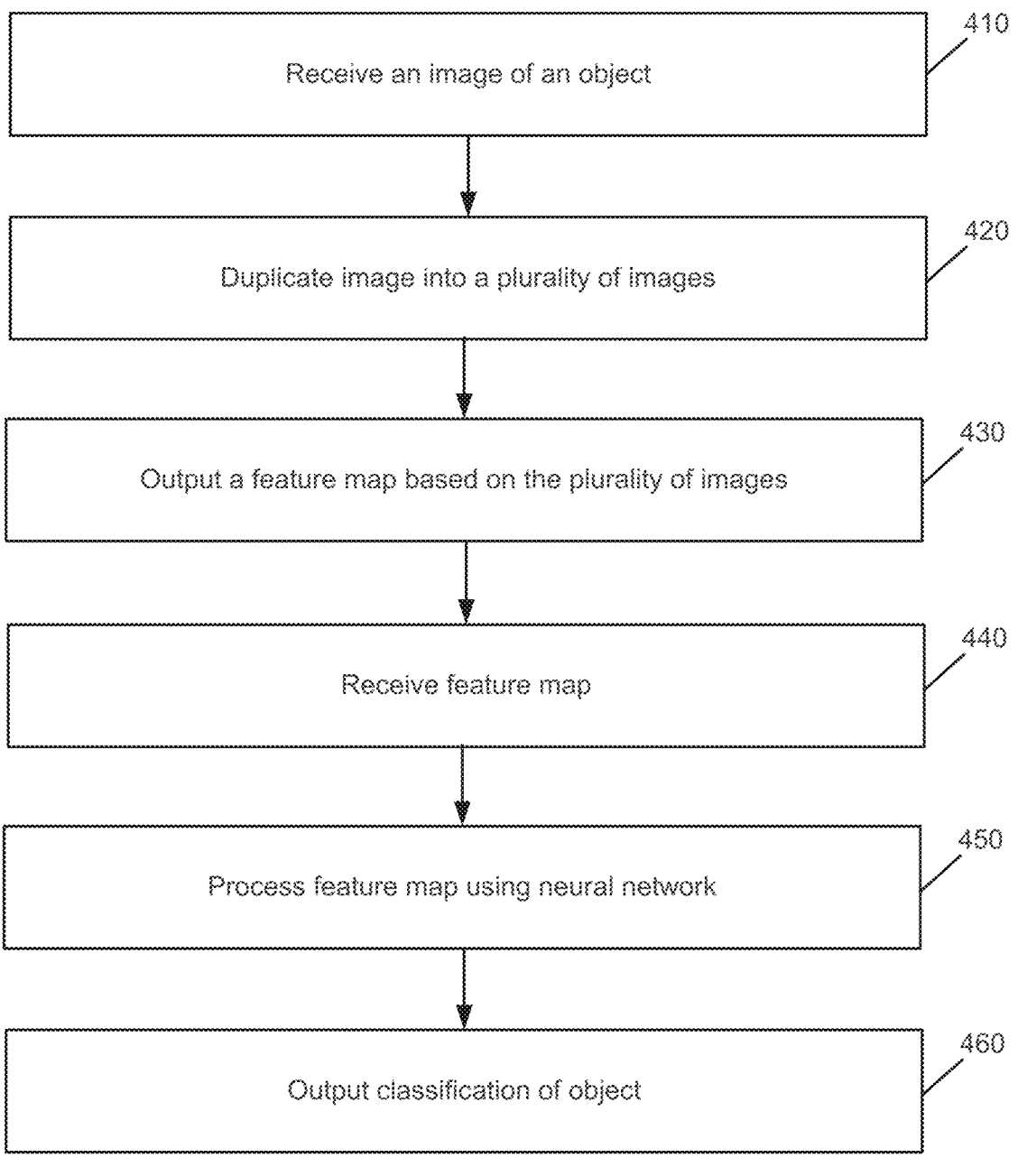
FIG. 4 is an illustration of an example method for using an object classification system.

FIG. 4 is an illustration of an example method for using an object classification system. The method 400 may be implemented in part by the object classification system 100.

At 410, an image of an object is received. The Image 125 of the object 120 may be received by an optical front end 101 of the object classification system 100. The object 120 may be a letter, for example. Other types of objects may be supported.

At 420, the image is duplicated into a plurality of images. The image 125 may duplicated by the lens 115. The lens 115 may be a multi-channel metalens and may duplicate the image 1205 into nine images. More or fewer duplicate images may be supported.

At 430, a feature map is output based on the plurality of images. The feature map 119 may be output by a kernel layer 117 of the optical front end 101. The kernel layer 117 may be a metasurface and may encode polarization and amplitude information for convolution with the plurality of duplicate images 125. The kernel layer 117 may function as a convolution layer for a neural network 107 of the digital back end 103. The kernel layer 117 may have been trained at the same time as the neural network 107. Depending on the embodiment, multiple feature maps 119 may be output by the kernel layer 117.

At 440, the feature map is received. The feature map 117, or feature maps, may be received by the image sensor 106 of the digital back end 103 from the kernel layer 117.

At 450, the feature map is processed using the neural network. The neural network 107 may process the feature map 119 stored on the image sensor 106. In some embodiments, the neural network is a shallow digital neural network. Other types of neural networks including deep neural networks may be supported.

At 460, a classification of the object is output. The classification 130 may be output by the neural network 107 of the digital back end 103. In some embodiments, the classification 130 may be a histogram that includes probabilities regarding possible types of the object 120 depicted in the image 125. Alternatively, the classification 130 may indicate the type with a highest probability.

Figure 5:
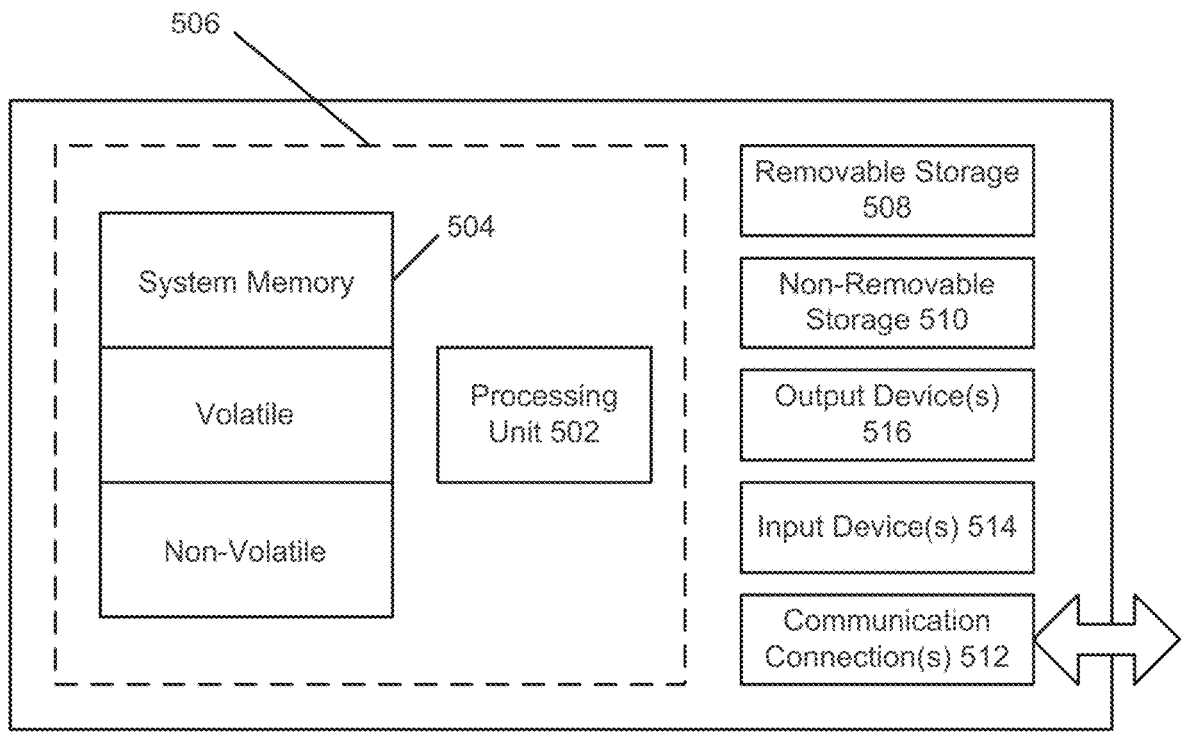
FIG. 5 illustrates an example computing device.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An object classification system comprising:
an optical front end adapted to;
   receive an image of an object; and
   output a feature map, or maps, based on the image; and
a digital back end adapted to:
   receive the feature map from the optical front end;
   process the feature map using a neural network; and
   output a classification for the object, wherein the optical front end comprises:
a lens adapted to duplicate the received image into a plurality of duplicate images; and
a kernel layer adapted to receive the plurality of duplicate images and to output the feature map based on the plurality of duplicate images, wherein the kernel layer is a metasurface that encodes polarization and amplitude information for convolution with the plurality of duplicate images, wherein the metasurface comprises a plurality of nanopillars, and the metasurface is trained using a set of training data and wherein a rotation angle of some or all of the plurality of nanopillars are set during the training.

2. The system of claim 1, wherein the plurality of duplicate images comprises multiple images.

3. The system of claim 1, wherein the lens is a multi-channel metalens.

4. The system of claim 1, wherein the kernel layer replaces a multifunctional kernel layer of the neural network.

5. The system of claim 1, further comprising:
receiving the set of training data; and
training the metasurface and the neural network using the set of training data.

6. The system of claim 1, wherein the neural network comprises a shallow or deep digital neural network.

7. The system of claim 1, wherein the classification for the object comprises a histogram.

8. The system of claim 1, wherein the system comprises a digital camera.

9. The object classification system of claim 1, wherein the lens comprises a single multi-channel metalens.

10. The object classification system of claim 1, wherein the lens comprises a plurality of silicon nanopillars.

11. The object classification system of claim 1, wherein the lens comprises a super-cell comprising a plurality of resonators (i), wherein a phase delay of each resonator is given by the equation:

$$\phi_i = \frac{2\pi}{\lambda}\left(f - \sqrt{f^2 + (x - a_i)^2 + (y - b_i)^2}\right)$$

where f is a focal length of the lens, $\lambda$ is the working wavelength of the lens, x and y are spatial positions on the lens, and a and b correspond to a displacement of a unique focal spot corresponding to each resonator (i).

12. A method for classifying an object in an image comprising:
receiving an image of an object by an optical front end;
outputting a feature map, or maps, based on the image by the optical front end;
receiving the feature map from the optical front end by a digital back end;
processing the feature map using a neural network by the digital back end; and
outputting a classification for the object by the digital back end, wherein the optical front end comprises:
a lens adapted to duplicate the received image into a plurality of duplicate images; and
a kernel layer adapted to receive the plurality of duplicate images and to output the feature map based on the plurality of duplicate images, wherein the kernel layer is a metasurface that encodes polarization and amplitude information for convolution with the plurality of duplicate images, wherein the metasurface comprises a plurality of nanopillars, and the metasurface is trained using a set of training data and wherein a rotation angle of some or all of the plurality of nanopillars are set during the training.

13. The method of claim 12, wherein the plurality of duplicate images comprises nine or more duplicate images.

14. The method of claim 12, wherein the lens is a multi-channel metalens.

15. The method of claim 12, wherein the metasurface replaces a multifunctional kernel layer of the neural network.

16. The method of claim 12, further comprising:
receiving the set of training data; and
training the metasurface and the neural network using the set of training data.

17. The method of claim 12, wherein the neural network comprises a shallow or deep digital neural network.

18. The method of claim 12, wherein the classification for the object comprises a histogram.

19. A digital camera comprising:
an optical front end adapted to:
receive an image of an object; and
output a feature map, or maps, based on the image; and
a digital back end adapted to:
receive the feature map from the optical front end;
process the feature map using a neural network; and
output a classification for the object, wherein the optical front end comprises a lens adapted to duplicate the received image into a plurality of duplicate images; and
a metasurface adapted to receive the plurality of duplicate images and to output the feature map based on the plurality of duplicate images, and wherein the metasurface replaces a multifunctional kernel layer of the neural network, and wherein the metasurface encodes polarization and amplitude information for convolution with the plurality of duplicate images, wherein the metasurface comprises a plurality of nanopillars, and the metasurface is trained using a set of training data and wherein a rotation angle of some or all of the plurality of nanopillars are set during the training.

* * * * *